United States Patent

Bravo

Patent Number: 5,870,929
Date of Patent: Feb. 16, 1999

[54] GEAR-SHIFT DEVICE FOR AN AUTOMATIC GEARBOX

[75] Inventor: Ernesto Bravo, Cambiano, Italy

[73] Assignee: Dr. Ing. h.c.F. Porsche AG, Weissach, Germany

[21] Appl. No.: 829,289

[22] Filed: Mar. 31, 1997

[30] Foreign Application Priority Data

Mar. 29, 1996 [IT] Italy ................................. TO96A0248

[51] Int. Cl.⁶ ................................................. B60K 20/00
[52] U.S. Cl. ..................................... 74/473.18; 74/473.15
[58] Field of Search ........................... 74/471 R, 473.18, 74/473.15, 473.1

[56] References Cited

U.S. PATENT DOCUMENTS

| | | | |
|---|---|---|---|
| 4,326,432 | 4/1982 | Miller | 74/475 |
| 5,205,180 | 4/1993 | Moroto et al. | 74/473 R |
| 5,682,789 | 11/1997 | De Crouppe et al. | 74/335 |

FOREIGN PATENT DOCUMENTS

| | | |
|---|---|---|
| 0307846A1 | 3/1989 | European Pat. Off. . |
| 0575658A1 | 12/1993 | European Pat. Off. . |

*Primary Examiner*—Charles A. Marmor
*Assistant Examiner*—David Fenstermacher
*Attorney, Agent, or Firm*—Evenson McKeown Edwards & Lenahan, PLLC

[57] ABSTRACT

A gear-shift device includes a pivotably mounted selector lever for actuation by the driver, a pivotably mounted actuating lever linked to the selector lever and a transmission member articulated to the actuating lever and which in use acts upon an automatic gear box transmission. The selector lever is pivotably mounted at a first pivot axis through a shift device housing so as to be movable in first and second gear shift gates connected by transverse gate. The actuating lever is supported at the housing for pivotal movement about a second pivot axis spaced from the first pivot axis. A disengageable coupling connects the actuating lever and the selector lever when the selector lever is in the first shifting gate and disconnects the selector lever and actuating lever when the selector lever is moved to the second shifting gate. The coupling connection is disposed spaced from the first and second pivot axes and is configured to provide pivotal movement of the actuating lever about the second pivot axis in response to pivotal movement of the selector lever about the first pivot axis, while accommodating relative sliding movement of the levers with respect to one another at the coupling connection.

12 Claims, 4 Drawing Sheets

GEAR-SHIFT DEVICE FOR AN AUTOMATIC GEARBOX

BACKGROUND AND SUMMARY OF THE INVENTION

This application claims the priority of Italian application TO 96 A 000248 filed Mar. 29, 1996 in Italy, the disclosure of which is expressly incorporated by reference herein.

The invention relates to a gear-shift device for an automatic gearbox of a motor vehicle, with a pivotable selector lever, a pivotably mounted actuating lever linked to the selector lever and a transmission member articulated to the actuating lever and acting on the automatic gearbox.

A gear-shift device for an automatic gearbox of a motor vehicle is disclosed in European Patent Document EPO 413 116 B1. Here the movement of a selector lever is taken up by an entrainment means and is transmitted to an actuating lever. An actuating rod mounted on the actuating lever then leads to the gearbox. The selector lever and the entrainment means are mounted on a common shaft. The gear-shift device shown has a large structural depth since the actuating lever is situated opposite the selector lever. The gear-shift device illustrated is obviously intended for insertion in an aperture in the body, the selector lever being arranged on one side of the body and the actuating lever on the other.

In contrast, an object of the present invention is to provide a gear-shift device for an automatic gearbox which is suitable for mounting on a body, i.e. does not penetrate the body.

This object is attained by providing a gear shift device wherein the gear-shift device is arranged on the surface of a body, wherein the selector lever is mounted close to said surface, wherein an articulation point of the transmission member on the actuating lever is formed close to said surface, and wherein a coupling point for coupling the selector lever and the actuating lever is situated on the selector lever between the pivot shaft for the selector lever and an actuating face of the selector lever.

According to the invention it is proposed to design a gear-shift device comprising a pivotably mounted selector lever for actuation by the driver, a pivotably mounted actuating lever linked thereto, and a transmission member which is articulated to the actuating lever and which acts upon the automatic gearbox, in such a way that the gear-shift device is arranged on the surface of a body, the selector lever is mounted close to the surface, the articulation point of the transmission member on the actuating lever is formed close to the surface, and the coupling point is situated on the selector lever between the pivot shaft and an actuating face of the selector lever. In this context an actuating face is to be understood as being that face of the selector lever which is gripped by the driver in order to actuate the selector lever.

By means of the invention both the pivot shaft of the selector lever and the guide of the transmission member leading to the gearbox are situated close to the body. In addition, the actuating stroke produced at the transmission member can be set without fundamental structural alterations, so that the gear-shift device can be adapted to various gearboxes, and in particular while retaining the movement ratios on the selector lever.

Advantageous further developments of the invention are described in conjunction with the described preferred embodiments of the invention. In certain preferred embodiments, it is proposed to form the connection point by providing, on one of the two levers, two projections which embrace a bulging area provided on the other lever.

Other objects, advantages and novel features of the present invention will become apparent from the following detailed description of the invention when considered in conjunction with the accompanying drawings.

DETAILED DESCRIPTION OF THE DRAWINGS

Figure 2:
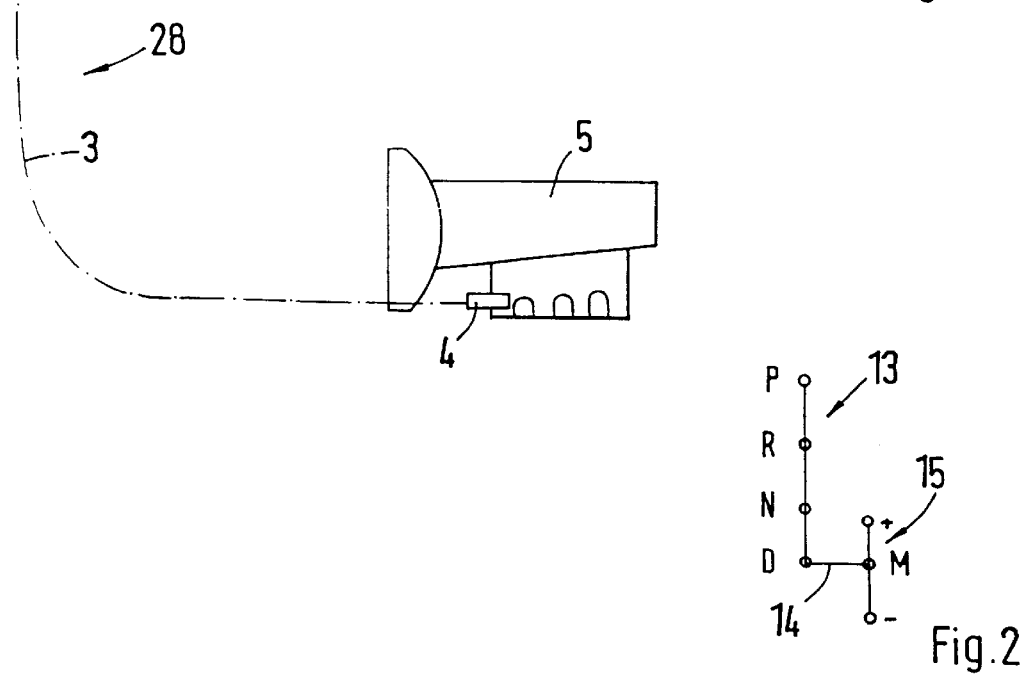
FIG. 2 is a gear-shift diagram of a selector lever in the gear-shift device according to FIG. 1.

The general view given in FIG. 2 shows a gear-shift device 2 which is held on a body 1 and which is connected to a control slide 4 of an automatic gearbox 5 by a Bowden cable 3 acting as a transmission means. The gear-shift device 2 comprises a selector lever 6, which has a push button 7, a transmission lever 8, which is connected to the Bowden cable 3, a housing 9, a locking device 10 and a locking device 11. An indented guide slot 12 is formed in the housing 9 and is part of both the locking device 10 and the locking device 11.

Figure 1:
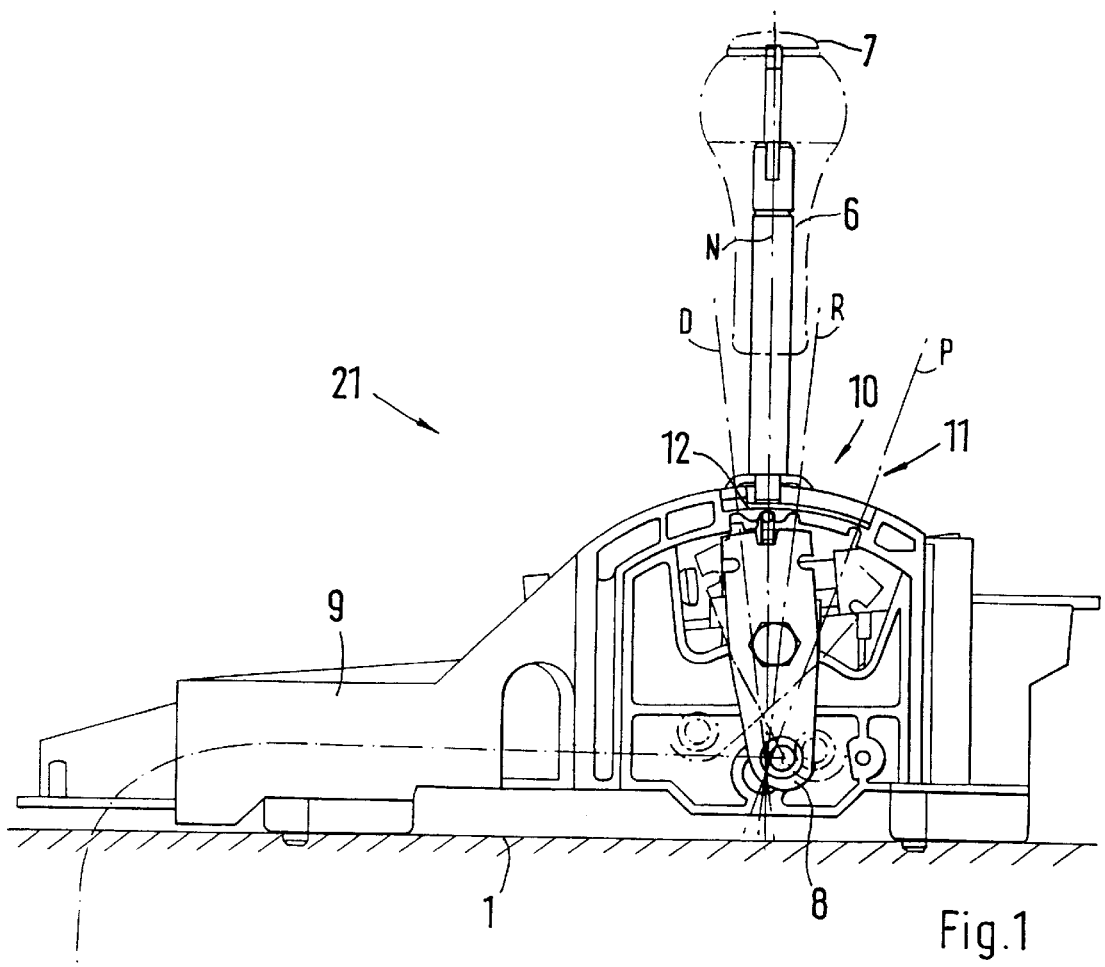
FIG. 1 is an overall schematic sectional view of a gear-shift device which is connected to an automatic gearbox constructed according to a preferred embodiment of the invention.

As shown in the gear-shift diagram shown in FIG. 2, the selector lever 6 is movable. A first gear-shift gate 13 has the positions P, R, N and D, as known in a conventional manner for the automatic operation of the automatic gearbox 5. As long as the locking means 11 is not unlocked by pressing the push button 7, the selector lever 6 is held firmly in these positions in the first gear-shift gate 13 by the locking means 11 which cooperates with the indented guide slot 12; in the illustration according to FIG. 1 the selector lever 6 is in position N. The push button 7 at the same time forms the upper boundary of the actuating face of the selector lever 6. The selector lever can be pivoted by way of a transverse gate 14 into the second gear-shift gate 15 which is arranged parallel to the first gear-shift gate 13. In the second gear-shift gate 15 the selector lever 6 occupies a neutral central position M under the action of a spring and can be moved out of the said position M by longitudinal pivoting inside the second gear-shift gate 15 into a position "+" or in the opposite direction into a position. When the selector lever 6 reaches the position "+" a shift up in the gearbox 5 is initiated; when the position "−" is reached, a shift down is initiated.

Figure 3:
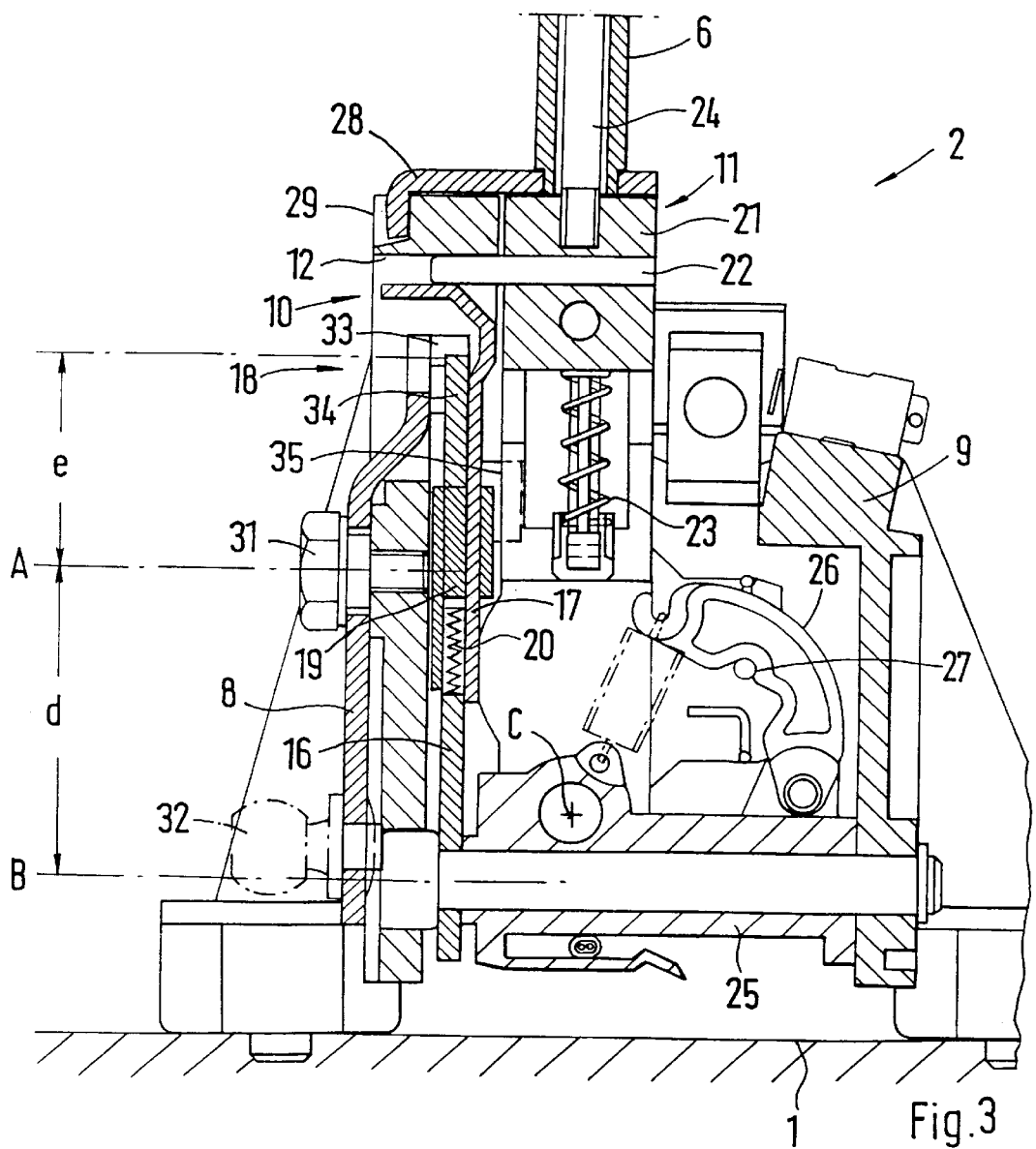
FIG. 3 is a section through the gear-shift device of FIG. 1.
Figure 4:
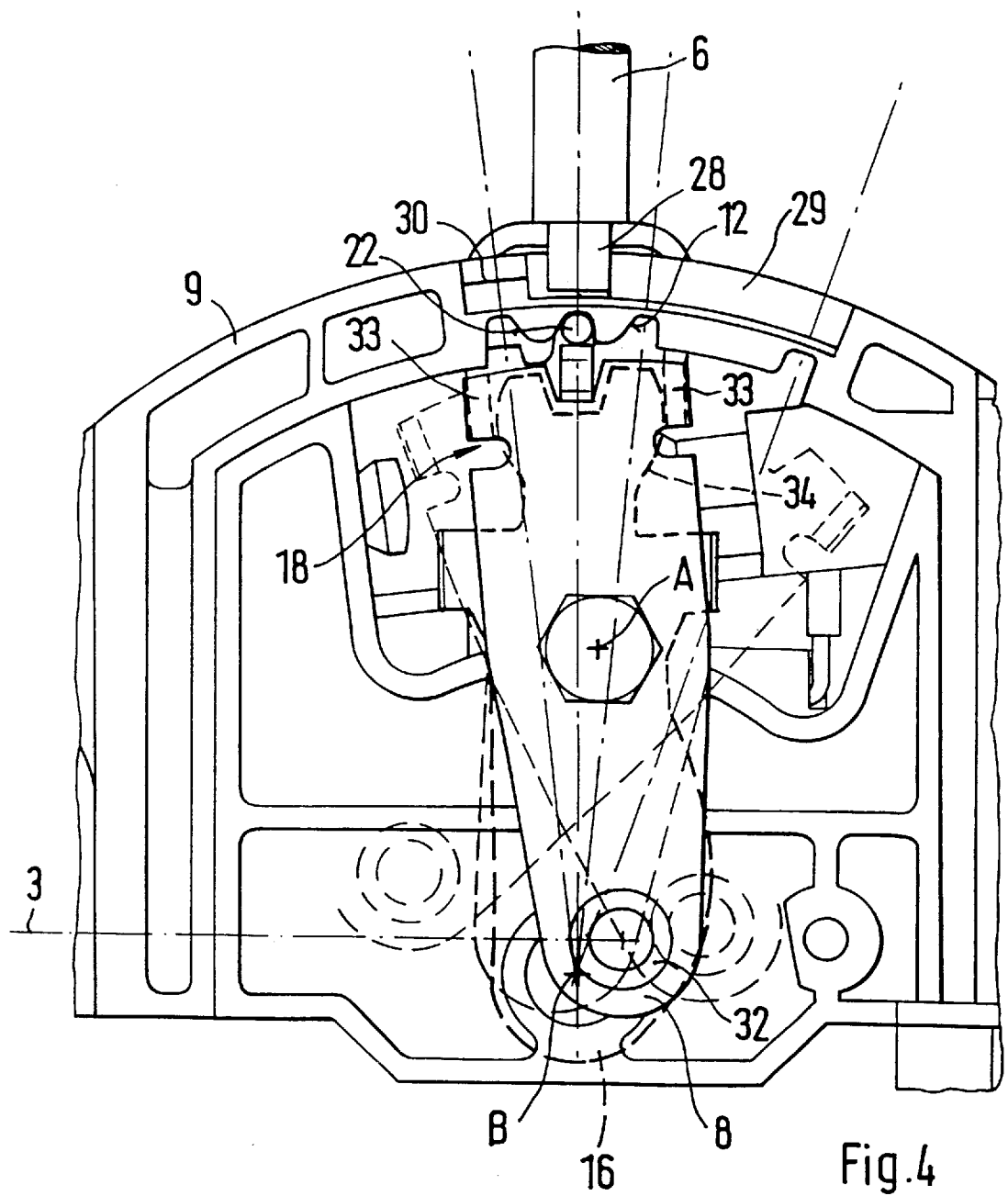
FIG. 4 is a side view of a partial area of the gear-shift device of FIG. 1.

It is evident from the section according to FIG. 3 and from the side view according to FIG. 4 that the transmission lever 8 is linked to a second lever 16 which has a slide 17. The transmission lever 8 is mounted pivotably on a shaft A. The second lever 16 is likewise mounted pivotably on a shaft B, which extends parallel to and at a distance d from the shaft A, and it is linked to the transmission lever 8 in an area 18. The slide 17 is held by means of a guide 19 on the second lever 16 and is held there pre-stressed by a spring 20 in the direction of the indented guide slot 12. A further slide 21, which has a pin 22, is provided on the selector lever 6 which is pivotable transversely to the first gear-shift gate 13 about a shaft C. The slide 21 is held by a spring 23 in its rest position illustrated. A thrust rod 24 connects the push button 7 to the slide 21.

The shaft C is formed in an intermediate member 25 which in turn is mounted in the housing 9 by shaft B which extends at right angles to the shaft C. The shaft B allows the selector lever 6 to be pivoted in the longitudinal direction both of the first gear-shift gate 13 and of the second gear-shift gate 15. A spring-loaded catch member 26 cooperates with a pin 27 mounted on the selector lever 6, in such a way that the selector lever 6 occupies either a position in the first gear-shift gate 13 or a position in the second gear-shift gate 15, without remaining in an intermediate position, during movement along the transverse gate 14. A guide finger 28 arranged on the selector lever 6 above the slide 21 engages in a groove 29 which is formed in the housing 9. In this way, the selector lever 6 is guided in the first gearshift gate 13. At the level of the transverse gate 14 the groove 29 opens out to form a transverse groove 30, so that the selector lever 6 can now move along the transverse gate 14. The guide finger 28 is guided with slight play both in the groove 29 and in the transverse groove 30.

The shaft A, on which the transmission lever 8 is mounted, is formed by a bolt 31 screwed into the housing 9. A ball end 32 for fastening the Bowden cable 3 is provided at one end of the transmission lever 8, whereas two spaced projections 33 are formed at the opposite end of the transmission lever 8. The ball end 32 comes to be situated adjacent to the body 1 to which the gear-shift device 2 is secured. In addition, the Bowden cable 3 can be guided therewith at a slight distance from the body 1.

The second lever 16, on the other hand, is mounted at one end thereof on the shaft B and is provided at the opposite end with a bulging area 34. Two projections 35 are provided therebetween, the said projections 35 embracing the selector lever 6 when it is in the first gear-shift gate 13, so that the second lever 16 moves in synchronism with the selector lever 6.

The linking of the movements of the second lever 16 to the transmission lever 8 takes place in the area 18 in which the bulging area 34 is embraced by the projections 33 of the transmission lever 8.

Figure 5:
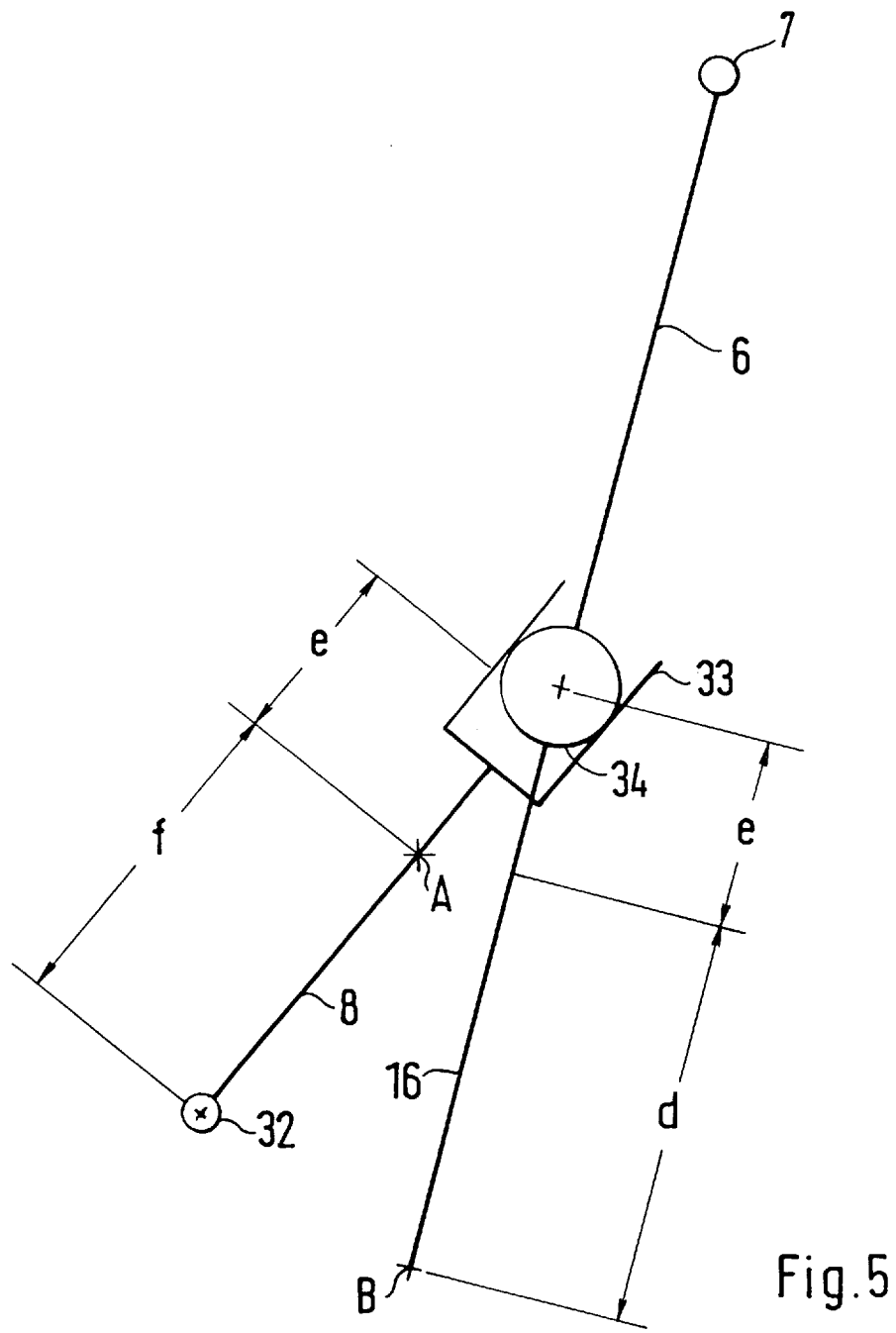
FIG. 5 is a diagram to illustrate the linking of the members involved in the transmission of the movement of the selector lever.

FIG. 5 shows once more the linking of the transmission lever 8 to the second lever 16 by way of a diagram. As may be clearly seen, the path covered on the ball end 32 depends primarily upon the ratios of the distances d, e and f, the distance d being formed between the shafts A and B, the distance e being formed between the shaft A and the center of the bulging area 34, and the distance f being formed between the shaft A and the center of the ball end 32. Since the position of the shafts A and B and therefore the distance d can be altered only by altering the design of the housing 9, the distance d is to be regarded as being essentially invariable. The operating path on the ball end 32 is thus preferably set by altering the distances e and f, which in turn depend only on the shape of the transmission lever 8 and of the second lever 16. It is therefore possible to adapt the operating path on the ball end 32 in an extremely inexpensive manner by simply altering two sheet-metal components, namely the transmission lever 8 and the second lever 16. In this connection, the distance f can be chosen to be such that the ball end 32 and together therewith the Bowden cable 3 extend at a slight distance from the body 1, so that the Bowden cable 3 can be secured and set on the body 1 without additional means, such as for example spacer blocks.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A gear-shift device comprising:

a housing, a manually operable selector lever movable in first and second gear shift gates connected by a transverse gate, said selector lever being supported at the housing for pivotal movement about a first fixed pivot axis, an actuating lever supported at the housing for pivotal movement about a second fixed pivot axis which is spaced from said first pivot axis, and a disengageable coupling connection between the actuating lever and the selector lever which connects the selector lever and actuating lever for gear change shifting movement of the actuating lever when said selector lever is in the first shifting gate and disconnects the selector lever and actuating lever when the selector lever is moved to the second shifting gate, wherein said coupling connection is disposed spaced from said first and second pivot axes and is configured to provide pivotal movement of said actuating lever about said second pivot axis in response to pivotal movement of the selector lever about said first pivot axis while accommodating relative sliding movement of said levers with respect to one another at the coupling connection.

2. A gear-shift device according to claim 1, wherein the first pivot axis is disposed below the second pivot axis.

3. A gear-shift device according to claim 2, wherein the coupling connection is disposed above the second pivot axis.

4. A gear-shift device according to claim 3, wherein said housing is configured to be mounted on a vehicle body member surface, and wherein said actuating lever includes an articulation point at a lower end thereof for connecting with a transmission operating member.

5. A gear-shift device according to claim 3, wherein the selector lever includes a manually movable member which is connected to a locking member for locking said selector lever in respective selected positions in said first shifting gate.

6. A gear-shift device according to claim 5, wherein said manually movable member extends above said coupling connection to a position where it is to be manually grasped during use thereof.

7. A gear-shift device according to claim 6, wherein said housing is configured to be mounted on a vehicle body member surface, and wherein said actuating lever includes an articulation point at a lower end thereof for connecting with a transmission operating member.

8. A gear-shift device according to claim 1, wherein said housing is configured to be mounted on a vehicle body member surface, and wherein said actuating lever includes an articulation point at a lower end thereof for connecting with a transmission operating member.

9. A gear-shift device according to claim 8, wherein said levers and coupling connection are dimensioned and configured such that a maximum movement of the articulation point occurs during maximal pivoting of the selector lever about said first pivoting axis.

10. A gear-shift device according to claim 1, wherein the coupling connection is formed by a bulging area on one of the actuating lever and a member movable with the selector lever, which bulging area is embraced by two projections on the other of the actuating lever and the member movable with the selector lever.

11. A gear-shift device according to claim 10, wherein the member movable with the selector lever is a second lever which is selectively linked to the selector lever in dependence on the disposition of the selector lever in the first shifting gate.

12. A gear-shift device according to claim 1, wherein the coupling connection is formed on a further lever which moves with the selector lever when the selector lever is in the first shifting gate and which is disengaged from the selector lever when the selector lever is in a second shifting gate.

* * * * *